United States Patent [19]
Davidson

[11] 4,403,653
[45] Sep. 13, 1983

[54] HEAT TRANSFER ELEMENTS

[76] Inventor: Maxwell W. Davidson, 31/32 Moray Pl., Edinburgh, Scotland, EH3 6BZ

[21] Appl. No.: 143,840

[22] Filed: Apr. 23, 1980

Related U.S. Application Data

[63] Continuation-in-part of Ser. No. 933,130, Aug. 9, 1978, abandoned.

[30] Foreign Application Priority Data

Aug. 11, 1977 [GB] United Kingdom .............. 33662/77

[51] Int. Cl.³ .......................... F28F 3/04; F28F 21/06
[52] U.S. Cl. .................................... 165/170; 165/180; 428/379
[58] Field of Search ............... 165/170, 180, 179, 185; 126/449; 428/212, 379, 913, 236, 256, 251, 294, 295

[56] References Cited

U.S. PATENT DOCUMENTS

| | | | |
|---|---|---|---|
| 902,812 | 11/1908 | Goetz | 165/170 |
| 1,803,764 | 5/1931 | Miller | 165/170 |
| 3,236,294 | 2/1966 | Thomason | 126/449 X |
| 4,065,592 | 12/1977 | McAllister | 126/449 X |
| 4,072,142 | 2/1978 | Lof | 126/449 |
| 4,154,224 | 5/1979 | Ferriera | 126/449 X |
| 4,203,421 | 5/1980 | Bencic | 126/449 X |
| 4,230,175 | 10/1980 | Disselbeck et al. | 165/170 X |

FOREIGN PATENT DOCUMENTS

| | | | |
|---|---|---|---|
| 992 | 3/1979 | European Pat. Off. | 126/449 |
| 7929 | 2/1980 | European Pat. Off. | 126/449 |
| 55-121395 | 9/1980 | Japan | 165/185 |
| 1170636 | 11/1969 | United Kingdom | 165/170 |

OTHER PUBLICATIONS

Donegane et al., Heat Conducting Washer, IBM Technical Disclosure Bulletin, vol. 8, No. 1, Jun. 1965, p. 206.

*Primary Examiner*—Sheldon J. Richter
*Attorney, Agent, or Firm*—Nathaniel A. Humphries

[57] ABSTRACT

A heat-transfer panel or sheet material comprises a woven wire mesh core of high thermal conductivity metal, for example copper or nickel, embedded in a closure layer of plastics material, for example a urethane, so that the mesh and the closure layer extend in the same longitudinal direction. The mesh core defines a nodal network and the nodes are located at or closely adjacent the outer surfaces of the closure layer so that satisfactory heat transfer between opposite sides of the panel is achieved over the whole outer surface area of the panel by virtue of heat conduction by the mesh core.

10 Claims, 5 Drawing Figures

HEAT TRANSFER ELEMENTS

DESCRIPTION OF THE INVENTION

This application is a continuation-in-part of my copending application Ser. No. 933,130 filed Aug. 9, 1978, now abandoned.

The present invention relates to a heat-transfer boundary panel which is of composite construction having one portion of relatively lower thermal conductivity and a further portion of relatively higher thermal conductivity, said further portion serving to transfer the bulk of the heat in the panel. The panel finds particular use as a heat transfer plate element bounding two zones and enabling the transfer of heat between the zones. The panel can also be formed as a heat transfer tube.

Prior Art

As distinct from plain heat transfer panels of metallic construction, composite form heat transfer elements are known which are made from different materials. One of these materials can be of higher thermal conductivity e.g. copper and can serve to transfer the bulk of the heat in the panel and the construction can provide improved heat transfer on a unit cost basis in comparison with a plain panel. One particular form of prior art composite panel as shown in U.K. Pat. No. 488591 (Bell) comprised a wall with a plurality of rods or studs extending transversely through the wall and projecting from either side of the wall. A similar construction is shown in U.K. Pat. No. 715508 (Aktiebolaget Svenska Maskinverken).

In an alternative arrangement as shown in U.S. Pat. Nos. 1,734,274 (Schubart) and 3,825,063 (Cowans), layers of woven metal mesh are used instead of the rods or studs and these layers again extend transversely through a boundary wall. In all these prior art arrangements, heat transfer is basically achieved across the boundary wall by the conduction of heat longitudinally along the layers (or rods) from a zone on one side of the boundary wall to a zone on the other side of the wall.

Due to the relative transverse orientation of the rods (or woven layers) and the boundary wall, these prior art heat transfer structures were relatively bulky, and indeed generally were not formed until the heat transfer apparatus of which they were part was fabricated as a whole: they were not really suitable as base elements or material from which a wide variety of forms of heat exchange apparatus could be constructed.

It is the principal object of the present invention to provide base heat-transfer sheet material which can be conveniently and satisfactory used in the fabrication of heat-exchange apparatus.

A further object of the present invention is to provide a heat transfer boundary panel which is economic to manufacture but which provides a satisfactory heat transfer performance over the whole surface area of the panel.

Yet a further object of the invention is to provide a heat transfer panel, and particularly a fluid ducting panel, which is of relatively slim form thereby enabling the panel to be very satisfactorily used in a wide variety of heat exchangers such as for example domestic radiators.

More specifically it is an object of the invention to provide a novel heat exchange sheet panel embodying a woven metal mesh embedded in a plastics closure layer.

Other objects and advantages of the invention will become apparent from the following detailed description taken with reference to the accompanying drawings, wherein.

Figure 1:
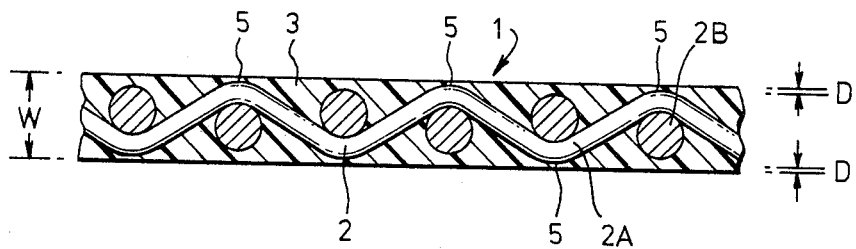
FIG. 1 shows an end view of a heat exchange panel according to one embodiment of the present invention.

Referring to FIG. 1, a heat transfer panel or wall portion 1 has a metal/plastics matrix comprising a woven (or knitted) openwork wire mesh 2 or cloth embedded in a plastics layer 3, the mesh 2 and layers extending in the same longitudinal direction. In this example, the mesh 2 is made from strands of copper, but aluminum, nickel, bronze or other strand material of high thermal conductivity could be used; and the layer 3 is a thermoplastic or thermosetting plastic having suitable flexibility to permit thermal stressing during operation of the panel. The plastics should be able to withstand the highest operational temperature. A urethane or other elastomer is a suitable material for the core layer. The plastics can be applied in the molten state to the woven mesh 2 or alternatively the mesh 2 can be immersed or dipped in a bath of molten plastics material: in both cases the plastics closes the spaces of the mesh 2.

Figure 2:
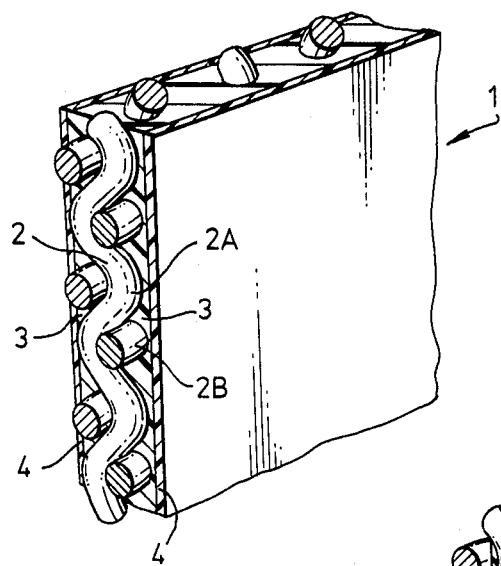
FIG. 2 shows a pictorial view of the panel of FIG. 1 but including a modification.

The undulating "warp" strands 2A and also the undulating weft strands 2B of the woven mesh 2 define a nodal network and extend transversely across the depth of the matrix 1 so that the nodes 5 of the network lie closely adjacent the outer surfaces of the matrix. In the example shown in FIG. 1, the panel has a width W of 0.7 cm while the distance D of the nodes 5 from the outer surfaces of the layer 3 is 0.015 cm. Preferably the distance D should not exceed 0.02 cm. To ensure that the mesh is fully embedded the panel of FIG. 2 has thin polyester coating layers 4 say of 0.1 mm thickness applied to the outer surfaces of the matrix 1. It will be understood that other plastics material could be used for the coatings 4. The wire mesh 2 is thus shielded from any corrosive effects of the heat exchange fluids, but the outer coatings 4 may be made porous to deter the build-up of fouling films on the panel surfaces, particularly if a copper mesh is used. The porous coating can be made by any well known technique, such as porous foaming. The thermal conductivity K should be 0.2 or more.

By way of example, a 30 mesh plain weave wire mesh could be used with 0.28 mm diameter wire, so that 18.75% of the normal area of the panel is provided by the mesh with the balance (81.25%) made up by the plastics core. In operation, the metal mesh 2 conducts heat across the depth of the panel, for heat exchange between fluids on either side of the panel. The above panel should have a heat transfer performance superior to that of a similarly dimensioned steel sheet panel.

The flat panel can be formed with the outer surfaces having a corrugated, ridged or other patterned effect: but the whole panel could be corrugated uniformally and set in the required form. The panel could be rolled and closed to form a tube (with or without corrugations etc.,), or alternatively the panel in strip form and prior to curing could be helically on a mandrel and allowed to set to form a tube. Mesh is generally formed in elongate strips or bands and an initial metal/plastics matrix could be formed 2 meters wide and 1000 meters long. If a suitable plastics is chosen for the matrix, then the metal/plastics matrix may be conveniently machined or cold worked.

Figure 3:
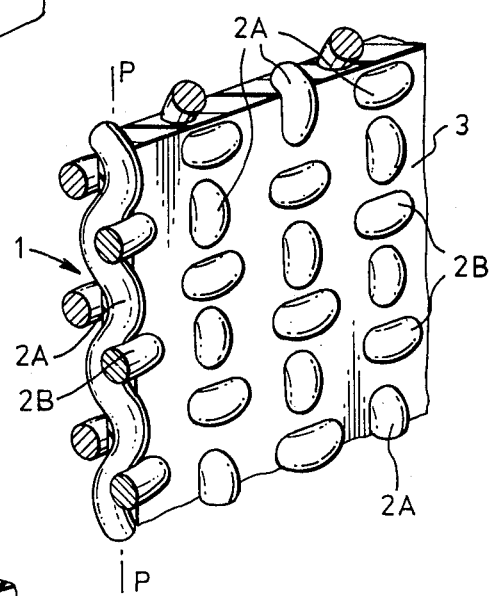
FIG. 3 shows a pictorial view of a heat exchange panel according to a second embodiment of the present invention.

In the embodiment of the present invention shown in FIG. 3, the metal/plastics matrix 1 is formed substantially as before and so that there is provided a plastics barrier in the mid-plane P—P of the matrix, but in this case the warp 2A of the woven mesh projects laterally from the side surfaces of the plastics barrier 3 and also parts of the "weft" 2B is exposed. The mesh 2 will therefore be exposed to the heat exchange fluids, via good heat conducting surfaces: it may be desirable however, to treat the mesh to mitigate any corrosion effects of the fluids. However, the projecting mesh will create a turbulent effect at the panel surfaces and this should assist the panel's heat exchange performance. It would be possible to have the mesh 2 project from only one surface of the plastics barrier layer.

The above heat exchange panels or walls can be used in a wide variety of heat exchangers, and will be particularly suitable for use in desalination apparatus. The panels could be advantageously used in the manufacture of radiators, particularly domestic radiators due to the relatively inexpensive construction of the panel and the obvious slimness of the panel will present a definite advantage.

Figure 4:
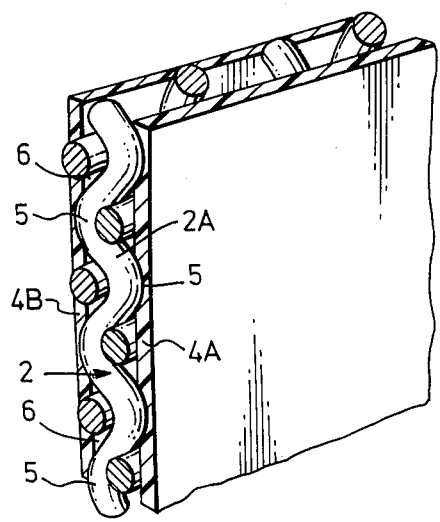
FIG. 4 shows a heat exchange ducting panel.

The further embodiment of the present invention shown in FIG. 4 is particularly intended for use in solar energy systems. In this embodiment a ducting panel 1 comprises a central core again constituted by an openwork woven mesh 2 of high thermal conductivity strands e.g. copper, and in this case the plastics closure layer is formed as two spaced layers 4A, 4B located at opposed sides of the mesh 2 with the nodes 5 of the mesh warp 2 embedded in the plastics layers 4A, 4B to bond the layers to the mesh and the nodes 5 against be closely adjacent the outer surfaces of the closure layers. Thus a central duct 6 is formed between the layers 4A, 4B with the mesh warp 2A extending longitudinally in this duct. At least one of the layers i.e. layer 4A exposed to the sunlight is highly absorbent to radiant energy. In operation, the highly absorbent layer 4A picks up heat energy of the sun rays. This heat is conducted from the surface by the mesh 2, and heat exchange fluid (liquid, or air or gas) flowing longitudinally in the central duct 6 is consequently heated. In a modification (FIG. 5) the layer 4A exposed to the sunlight comprises a transparent or translucent plastics layer, while the other closure layer 4B comprises a double-layer ⅜ one layer 7 of which is a heat absorbent layer adjacent the mesh 2 covered by an outer insulating layer 8.

Figure 5:
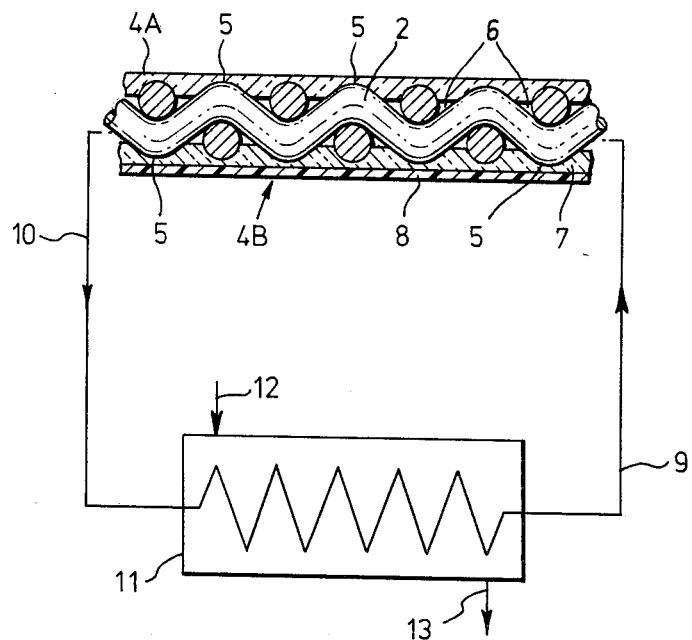
FIG. 5 shows a fluid circuit of a solar energy system including the ducting panel of FIG. 4.

FIG. 5 shows the fluid heating circuit of the solar energy system: this circuit includes a recirculation line 9, 10 for the flow of heat exchange fluid between a heat exchanger 11 and the duct 6 of panel 1. This recirculating fluid serves to heat a secondary fluid in the heat exchanger 11 which is supplied and discharged via lines 12 and 13 respectively. The ducting panel 1 of FIGS. 4 (and 5) particularly intended for use with a recirculating heat exchange liquid or fluid having a dark colour characteristic giving good heat absorbent properties. A particularly suitable heat exchange fluid of this type comprises a colloidal suspension of liquid (e.g. water) with fine carbon black particles: this may be referred to as "black water".

The present invention therefore provides a heat exchange panel or duct which will exhibit a very satisfactory heat exchange performance due to the high thermal conductivity effecting heat exchange mesh but which can be relatively inexpensive to manufacture since the bulk of the panel is made from less costly plastics material. The panel is particularly suitable for use as base heat-exchange material in the construction of a wide variety of forms of heat exchange apparatus.

I claim:

1. Heat transfer sheet material for use in the construction of heat exchangers and particularly for the formation of heating tubes, said sheet material serving for transfer of heat between zones on either side of the material and comprising a thin composite wall member having a solid voidless interior, said wall member being made from wall portions of different thermal conductivity, one wall portion of higher thermal conductivity comprising a close metal mesh with weft and warp strands woven together to define a nodal network, while a further wall portion of lower thermal conductivity plastics material constitutes a closure layer, said closure layer extending in the longitudinal direction of the metal mesh with outer surfaces parallel to the mesh and with the mesh embedded in the closure layer, the respective nodes of the network being located at said outer surfaces of the closure layer but with thin coatings of plastics material covering the nodes for protection of the mesh, said thin coatings presenting virtually no barrier to heat so that heat is transferred by the full area of the mesh from one outer surface of the wall member transversely across the layer and perpendicular to the mesh to the other outer surface of the wall member.

2. Heat transfer sheet material as claimed in claim 1, wherein the outer surfaces of the wall member are substantially smooth.

3. Heat transfer sheet material as claimed in claim 1, wherein the metal is copper, aluminum, nickel, or bronze.

4. Heat transfer sheet material as claimed in claim 1, wherein the plastics closure layer is a urethane.

5. Heat transfer sheet material as claimed in claim 1, wherein the nodes of the metal mesh are spaced from a respective outer surface of the wall member by a distance not exceeding 0.02 mm.

6. A heat transfer boundary panel for use in heat exchangers such as evaporators and radiators, the heat transfer boundary panel serving for transfer of heat between zones on either side of the panel and including a composite wall member made from wall portions of different thermal conductivity, one wall portion of higher thermal conductivity comprising a close metal mesh with weft and warp strands woven together to define a nodal network and serving for transfer of the bulk of the heat across the panel, while a further wall portion of plastics material having a lower thermal conductivity than said metal mesh constitutes a filler layer closing the spaces in the mesh, said filler layer extending in the longitudinal direction of the metal mesh with outer surfaces parallel to the mesh, nodes of the network being located adjacent the outer surfaces of the filler layer so as to be sufficiently close to fluid medium in at least one of said zones to permit a substantial transfer of heat by the mesh from one of said outer surfaces of the panel transversely across the panel and perpendicular to the mesh to the other surface of the panel.

7. A heat transfer panel as claimed in claim 6, wherein the metal mesh is copper, aluminum, nickel, or bronze.

8. A heat transfer panel as claimed in claim 6, wherein the plastics material filler layer is urethane.

9. A heat transfer panel as claimed in claim 6, wherein an additional coating layer is applied to at least one outer surface of the filler layer to ensure that the mesh is covered.

10. A heat transfer panel as claimed in claim 9, wherein the coating layer is porous to deter build up of fouling films on the panel outer surfaces.

* * * * *

REEXAMINATION CERTIFICATE (440th)
United States Patent [19]
Davidson

[11] B1 4,403,653
[45] Certificate Issued  Dec. 17, 1985

[54] HEAT TRANSFER ELEMENTS

[75] Inventor: Maxwell W. Davidson, Edinburgh, Scotland

[73] Assignee: United Wire Group PLC, Granton, England

Reexamination Request:
No. 90/000,621, Sep. 19, 1984

Reexamination Certificate for:
Patent No.: 4,403,653
Issued: Sep. 13, 1983
Appl. No.: 143,840
Filed: Apr. 23, 1980

Related U.S. Application Data

[63] Continuation-in-part of Ser. No. 933,130, Aug. 9, 1978, abandoned.

[30] Foreign Application Priority Data

Aug. 11, 1977 [GB] United Kingdom ............. 33662/77

[51] Int. Cl.⁴ .......................... F28F 3/04; F28F 21/06
[52] U.S. Cl. .................................... 165/170; 165/180; 428/269; 428/379
[58] Field of Search ................ 126/449; 165/170, 179, 165/180, 185; 428/212, 236, 251, 256, 269, 294, 295; 379, 913

[56] References Cited

U.S. PATENT DOCUMENTS

| | | | |
|---|---|---|---|
| 2,718,791 | 9/1955 | Hose et al. | 428/193 |
| 2,836,529 | 5/1958 | Morris | 428/257 |
| 3,158,526 | 11/1964 | Farnam et al. | 428/269 X |
| 3,694,699 | 9/1972 | Snyder et al. | 357/81 X |
| 3,825,063 | 7/1974 | Cowans | 165/165 |

FOREIGN PATENT DOCUMENTS

| | | | |
|---|---|---|---|
| 126348 | 1/1948 | Australia | 428/269 |
| 701420 | 1/1965 | Canada | 428/256 |

OTHER PUBLICATIONS

Diode Heat Sink, IBM Technical Disclosure Bulletin, vol. 2, No. 6, p. 69, Dunkel, Apr. 1960.

*Primary Examiner*—Sheldon J. Richter

[57] ABSTRACT

A heat-transfer panel or sheet material comprises a woven wire mesh core of high thermal conductivity metal, for example copper or nickel, embedded in a closure layer of plastics material, for example a urethane, so that the mesh and the closure layer extend in the same longitudinal direction. The mesh core defines a nodal network and the nodes are located at or closely adjacent the outer surfaces of the closure layer so that satisfactory heat transfer between opposite sides of the panel is achieved over the whole outer surface area of the panel by virtue of heat conduction by the mesh core.

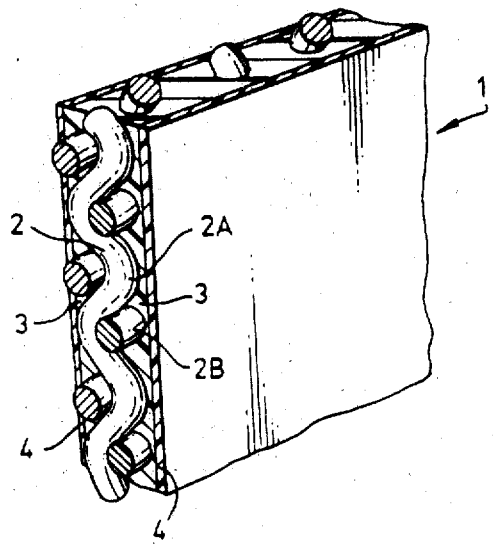

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-10 are cancelled.

New claims 11-19 are added and determined to be patentable.

*11. Heat exchange apparatus including heat exchange wall means separating hot and cold ducting serving respectively for the passage of relatively hot and cold fluids whereby heat can be transferred between the relatively hot and cold fluids in the ductings via said heat exchange wall means; said heat exchange wall means comprising a composite wall member made from first and second wall portions of different thermal conductivity, said first wall portion being of higher thermal conductivity and comprising a close metal mesh extending longitudinally to the fluid flow with weft and warp strands woven together to define a nodal network and serving for transfer of the bulk of the heat across the heat exchange wall, said second wall portion comprising a filler layer serving to close the spaces in the mesh and having outer surfaces, said filler layer being made wholly of plastics material and having a lower thermal conductivity than said metal mesh, and at least one additional coating layer applied to at least one outer surface of the filler layer to ensure that the mesh is covered, said additional coating layer being porous to deter build up of fouling films on at least one outer surface of the heat exchange wall by fluids flowing in the ductings, said second wall portion extending in the longitudinal direction of the metal mesh, with outer surfaces parallel to the mesh, nodes of the network being located adjacent the outer surfaces of the second wall portion so as to be sufficiently close to said relatively hot and cold fluid to permit a substantial transfer of heat by the mesh from one of said outer surfaces of the second wall portion transversely across the wall portion and perpendicular to the mesh to the outer surface of the second wall portion.*

*12. The apparatus as claimed in claim 11, wherein the filler layer comprises a urethane.*

*13. The apparatus as claimed in claim 11, wherein the outer surfaces of the second wall portion are smooth.*

*14. The apparatus as claimed in claim 11, wherein the metal mesh is made from copper.*

*15. The apparatus as claimed in claim 11, wherein the metal mesh is made from aluminum.*

*16. The apparatus as claimed in claim 11, wherein the metal mesh is made from nickel.*

*17. The apparatus as claimed in claim 11, wherein the metal mesh is made from bronze.*

*18. The apparatus as claimed in claim 11, wherein the thermal conductivity of the composite wall member is at least 0.2.*

*19. The apparatus as claimed in claim 11, wherein the nodes of the metal mesh are spaced from at least one outer surface of the second wall portion by a distance not exceeding 0.02 mm.*

* * * * *